Aug. 10, 1926.

F. O. WELLS

THREAD CUTTING DIE

Filed Feb. 10, 1925

1,595,438

INVENTOR.
Frank O. Wells.
BY
Harry W. Bowen.
ATTORNEY.

Patented Aug. 10, 1926.

1,595,438

UNITED STATES PATENT OFFICE.

FRANK O. WELLS, OF GREENFIELD, MASSACHUSETTS.

THREAD-CUTTING DIE.

Application filed February 10, 1925. Serial No. 8,162.

This invention relates to improvements in what is known as dies for use in cutting or forming threads on a piece of work. These dies are usually placed in a collet member with means for clamping them therein. The collet member is then placed in a die stock having the usual handles for operating the same for cutting a thread. The present invention relates solely to the construction of the dies themselves which are formed with oppositely located inclined sides and each of the ends of the die is formed with the inclined shaped recess for affording a large space to permit the chips to be freely discharged or thrown outward as the tool is operated and also for oiling purposes. These dies are each formed with thread cutting lands which are so formed that a thread may be cut to a shoulder by simply reversing the dies in the collet.

Referring to the drawings.

Figure 1:
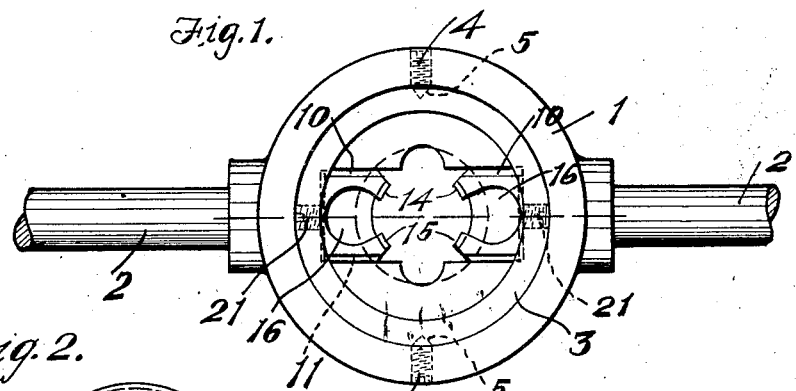
Fig. 1 is a plan view of two of the dies assembled for example in a collet or holder member which is placed in a die stock.
Figure 2:
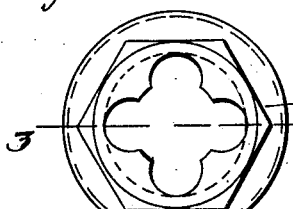
Fig. 2 is a top plan view of the clamping nut for retaining the dies in place in the collet, which nut serves as a guide or support for the work, while a thread is being cut.
Figure 3:
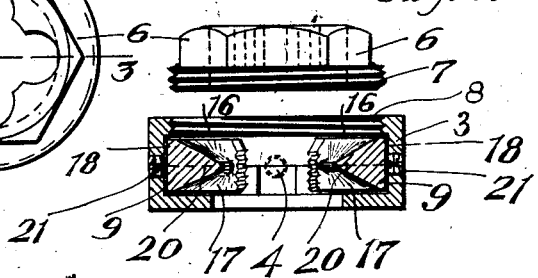
Fig. 3 is a vertical sectional view on the line 3—3 of Fig. 2 showing the dies in place and with the die clamping nut removed.
Figure 4:
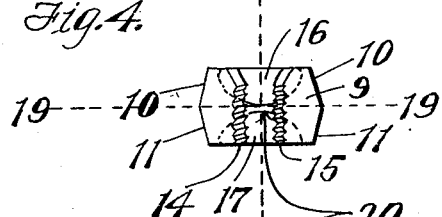
Fig. 4 is a top plan view of one of the dies showing the oppositely inclined ends, the strengthening rib between the thread cutting lands.
Figure 5:
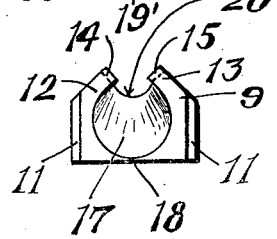
Fig. 5 is a side elevational view of the die showing one of the inclined recessed portions.

Referring to the drawings in detail:
1 designates the body or barrel portion of a die stock and 2 the operating handles secured thereto. 3 is the circular collet member which is secured in the body portion 1 by means of the set screws 4 which enter the tapered recesses 5 of the collet. 6 is the nut or clamping member which is formed with the threaded portion 7 which engages the threads 8 of the collet member 3 for clamping the dies therein. 9 designates one of the dies which are firmly clamped in the collet 3 by the nut 6. This member is formed with the oppositely arranged inclined surfaces 10 and 11 on its opposite edges. 12 and 13 are two inwardly extending projections on their inner edges of which are formed with the threads 14 and 15 or as they are some times termed thread cutting lands. These lands it will be observed extend the full length of the die as shown in plan view in Fig. 4. Located at the opposite ends of the die are the two inclined substantially cone shaped recesses 16 and 17. These recesses extend from near the lower or base edge 18 inward to the median or central plane represented by the line 19—19 where they meet and form the strengthening or brace rib 20 between the cutting lands. These inclined recessed portions 16 and 17, as shown in Fig. 3, permit the chips to be readily thrown away from the work and also permits the lands 12 and 13 to be readily oiled during the operation of cutting a thread.

The rib 20 serves to strengthen the lands radially along the line 19—19 as well as axially along the line 19'—19' when a thread is being cut. By reason of the inclined sides 10 and 11 the dies may be readily reversed in the collet so that a thread may be cut to a shoulder if desired. It will be observed that the ends of the lands 14 and 15 on which the thread forming teeth are located extend across the rib 20 and their outer portions are boundaries for the recesses 16 and 17 as shown.

It will be seen from this description that I have produced a thread cutting die element in which the thread forming lands are braced both axially and transversely or radially along the lines 19—19 and 19'—19'. The radial pressures are transmitted outward towards the bases 18—18.

These dies are adjusted in the collet by means of the screws 21.

What I claim is:

1. A screw cutting die which is formed with oppositely disposed and oppositely inclined recesses, thread cutting lands on the die, the recesses terminating in an unthreaded rib between the lands for strengthening the lands when considered axially of the die.

2. A die comprising a member which is formed with axially extending thread cutting lands that are substantially the length of the member and having ends which extend in parallel relation with the longitudinal axis of the member and which member is formed with oppositely inclined recesses which are formed in the ends of the die and intermediate the ends of the said lands, the said recesses being uniformly inclined towards a plane passing through the transverse axis of the die, whereby the chips that are produced are thrown away from the cutting edges of the lands and the lands may be oiled, as described.

3. A die having inclined recesses which are located between its opposite ends and which recesses terminate in a strengthening rib which is located in the center or median plane of the die and said die having thread cutting lands which extend around the border of the said recesses, and the said recesses extending substantially to the base of the die.

4. A die formed with axially extending lands, a strengthening rib for the lands located between the lands and in the median plane of the die.

5. A die formed with oppositely disposed inclined recesses which are arc shaped and which terminate with a strengthening rib between the recesses and thread forming lands located above and extending over the said rib and terminating at the ends of the die.

6. A screw cutting die which is formed with oppositely disposed and oppositely inclined recesses, thread cutting lands on the die, the said recesses terminating in a supporting part between the lands for strengthening the lands.

7. A screw cutting die having a plurality of cone shaped clearance cavities or recesses for carrying away the chips and for oiling purposes, said cavities being formed on both sides of the die and opposite each other, and terminating in an opening which communicates with each other, these cavities being formed at an angle with the sides of the die.

FRANK O. WELLS.